United States Patent
Macken et al.

(10) Patent No.: US 8,793,339 B2
(45) Date of Patent: Jul. 29, 2014

(54) FACILITATING CLIENT SERVER INTERACTION

(75) Inventors: Luke J. Macken, Westford, MA (US); Toshio E. Kuratomi, Granite Bay, CA (US)

(73) Assignee: Red Hat, Inc., Raleigh, NC (US)

( * ) Notice: Subject to any disclaimer, the term of this patent is extended or adjusted under 35 U.S.C. 154(b) by 675 days.

(21) Appl. No.: 12/201,306

(22) Filed: Aug. 29, 2008

(65) Prior Publication Data

US 2010/0057834 A1 Mar. 4, 2010

(51) Int. Cl.
*G06F 15/16* (2006.01)
*H04L 29/06* (2006.01)
*H04L 29/08* (2006.01)
*G06F 9/54* (2006.01)
*G06F 17/30* (2006.01)

(52) U.S. Cl.
CPC ............ *H04L 69/08* (2013.01); *H04L 67/2823* (2013.01); *G06F 9/543* (2013.01); *G06F 17/30569* (2013.01); *G06F 17/30893* (2013.01)
USPC ........... 709/219; 709/203; 709/231; 709/232; 709/237

(58) Field of Classification Search
None
See application file for complete search history.

(56) References Cited

U.S. PATENT DOCUMENTS

| | | | |
|---|---|---|---|
| 5,754,774 A | 5/1998 | Bittinger et al. | |
| 5,778,384 A | 7/1998 | Provino et al. | |
| 5,903,720 A * | 5/1999 | Stokes | 726/4 |
| 5,905,438 A | 5/1999 | Weiss et al. | |
| 5,926,636 A | 7/1999 | Lam et al. | |
| 5,969,967 A | 10/1999 | Aahlad et al. | |
| 6,012,098 A * | 1/2000 | Bayeh et al. | 709/246 |
| 6,023,698 A * | 2/2000 | Lavey et al. | 707/10 |
| 6,064,977 A * | 5/2000 | Haverstock et al. | 705/9 |
| 6,085,198 A | 7/2000 | Skinner et al. | |
| 6,092,114 A * | 7/2000 | Shaffer et al. | 709/232 |
| 6,151,624 A * | 11/2000 | Teare et al. | 709/217 |
| 6,308,212 B1 * | 10/2001 | Besaw et al. | 709/228 |
| 6,397,253 B1 * | 5/2002 | Quinlan et al. | 709/227 |
| 6,460,141 B1 * | 10/2002 | Olden | 726/4 |
| 6,473,759 B1 * | 10/2002 | Herrendoerfer et al. | 1/1 |
| 6,549,918 B1 * | 4/2003 | Probert et al. | 1/1 |
| 6,604,106 B1 * | 8/2003 | Bodin et al. | 1/1 |
| 6,687,745 B1 * | 2/2004 | Franco et al. | 709/219 |
| 6,937,588 B2 * | 8/2005 | Park | 370/338 |
| 7,089,583 B2 * | 8/2006 | Mehra et al. | 726/3 |
| 7,103,627 B2 * | 9/2006 | Kittredge et al. | 709/201 |
| 7,185,368 B2 * | 2/2007 | Copeland, III | 726/25 |

(Continued)

OTHER PUBLICATIONS

Non Final Office Action; mailed Dec. 7, 2009; U.S. Appl. No. 12/201,330.

(Continued)

*Primary Examiner* — Ian N Moore
*Assistant Examiner* — Dung B Huynh
(74) *Attorney, Agent, or Firm* — Lowenstein Sandler LLP (57) ABSTRACT

The system includes a server module to interact with a base client. The server module interacts with the logic of the web application to obtain the data requested by a base client data and sends it back to the base client in a format handled by the base client. The base client may then reformat the data to a client application requested format before passing the data to the client application. This method and system allows a client application programmer to obtain easily usable data from a web application by using the base client.

21 Claims, 3 Drawing Sheets

(56) References Cited

U.S. PATENT DOCUMENTS

| | | | | |
|---|---|---|---|---|
| 7,296,022 | B2* | 11/2007 | Harjanto | 1/1 |
| 7,296,076 | B1* | 11/2007 | Portolani | 709/227 |
| 7,318,083 | B2 | 1/2008 | Senda | |
| 7,321,918 | B2* | 1/2008 | Burd et al. | 709/203 |
| 7,366,777 | B2* | 4/2008 | Hill et al. | 709/226 |
| 7,505,795 | B1 | 3/2009 | Lim et al. | |
| 7,506,072 | B2* | 3/2009 | Waldorf et al. | 709/249 |
| 7,627,818 | B2* | 12/2009 | Hays | 715/269 |
| 7,640,348 | B2* | 12/2009 | Atwal et al. | 709/229 |
| 8,260,934 | B2 | 9/2012 | Sigal | |
| 2001/0005848 | A1 | 6/2001 | Haverstock et al. | |
| 2001/0009016 | A1* | 7/2001 | Hofmann et al. | 709/219 |
| 2001/0032273 | A1* | 10/2001 | Cheng | 709/249 |
| 2001/0034782 | A1 | 10/2001 | Kinkade | |
| 2001/0037404 | A1* | 11/2001 | Hafsteinsson et al. | 709/246 |
| 2001/0047427 | A1* | 11/2001 | Lansio et al. | 709/238 |
| 2002/0038340 | A1 | 3/2002 | Whipple et al. | |
| 2002/0046279 | A1 | 4/2002 | Chung | |
| 2002/0056006 | A1 | 5/2002 | Vange et al. | |
| 2002/0091798 | A1 | 7/2002 | Joshi et al. | |
| 2002/0099738 | A1* | 7/2002 | Grant | 707/513 |
| 2002/0103818 | A1 | 8/2002 | Amberden | |
| 2002/0107875 | A1* | 8/2002 | Seliger et al. | 707/200 |
| 2002/0183045 | A1 | 12/2002 | Emmerson et al. | |
| 2002/0194380 | A1* | 12/2002 | Sullivan et al. | 709/246 |
| 2002/0198985 | A1* | 12/2002 | Fraenkel et al. | 709/224 |
| 2003/0004874 | A1* | 1/2003 | Ludwig et al. | 705/40 |
| 2003/0009476 | A1 | 1/2003 | Fomenko et al. | |
| 2003/0048296 | A1 | 3/2003 | Cullen et al. | |
| 2003/0061404 | A1* | 3/2003 | Atwal et al. | 709/328 |
| 2003/0070006 | A1* | 4/2003 | Nadler et al. | 709/330 |
| 2003/0191803 | A1* | 10/2003 | Chinnici et al. | 709/203 |
| 2003/0233466 | A1 | 12/2003 | Kinkade | |
| 2004/0049571 | A1 | 3/2004 | Johnson et al. | |
| 2004/0081170 | A1 | 4/2004 | Schinazi | |
| 2004/0088140 | A1 | 5/2004 | O'Konski et al. | |
| 2004/0088571 | A1* | 5/2004 | Jerrim et al. | 713/201 |
| 2004/0138964 | A1 | 7/2004 | Okada et al. | |
| 2004/0181537 | A1* | 9/2004 | Chawla et al. | 707/100 |
| 2004/0260806 | A1* | 12/2004 | Martin et al. | 709/224 |
| 2005/0005141 | A1 | 1/2005 | Nagai et al. | |
| 2005/0015491 | A1* | 1/2005 | Koeppel | 709/226 |
| 2005/0015585 | A1* | 1/2005 | Kurose | 713/155 |
| 2005/0183061 | A1* | 8/2005 | Papanikolaou et al. | 717/103 |
| 2005/0198648 | A1* | 9/2005 | Wray et al. | 719/317 |
| 2005/0253851 | A1 | 11/2005 | Tsukamoto | |
| 2006/0015512 | A1* | 1/2006 | Alon et al. | 707/100 |
| 2006/0041685 | A1* | 2/2006 | Bracewell et al. | 709/246 |
| 2006/0041896 | A1* | 2/2006 | Yagi | 719/330 |
| 2006/0047780 | A1* | 3/2006 | Patnude | 709/219 |
| 2006/0112399 | A1* | 5/2006 | Lessly | 719/318 |
| 2006/0149746 | A1* | 7/2006 | Bansod et al. | 707/10 |
| 2006/0155682 | A1* | 7/2006 | Lection et al. | 707/3 |
| 2006/0168139 | A1* | 7/2006 | Messinger et al. | 709/219 |
| 2006/0206559 | A1* | 9/2006 | Xie et al. | 709/201 |
| 2006/0251233 | A1 | 11/2006 | Mott | |
| 2007/0014260 | A1 | 1/2007 | Seo | |
| 2007/0016639 | A1* | 1/2007 | Mukundan et al. | 709/203 |
| 2007/0220115 | A1* | 9/2007 | Srinivasan et al. | 709/219 |
| 2007/0256003 | A1* | 11/2007 | Wagoner et al. | 715/501.1 |
| 2007/0293212 | A1* | 12/2007 | Quon et al. | 455/420 |
| 2008/0034441 | A1* | 2/2008 | Saha et al. | 726/27 |
| 2008/0059187 | A1* | 3/2008 | Roitblat et al. | 704/257 |
| 2008/0065605 | A1* | 3/2008 | Bourland et al. | 707/3 |
| 2008/0114739 | A1 | 5/2008 | Hayes | |
| 2008/0140722 | A1* | 6/2008 | Jakobovits | 707/104.1 |
| 2008/0147875 | A1* | 6/2008 | Stapels | 709/232 |
| 2008/0201234 | A1* | 8/2008 | Castro et al. | 705/26 |
| 2008/0201338 | A1* | 8/2008 | Castro et al. | 707/100 |
| 2008/0209348 | A1* | 8/2008 | Grechanik et al. | 715/762 |
| 2008/0228983 | A1* | 9/2008 | Nishihara | 710/303 |
| 2008/0281898 | A1* | 11/2008 | Pesce et al. | 709/201 |
| 2008/0294515 | A1* | 11/2008 | Rupp | 705/14 |
| 2008/0313660 | A1* | 12/2008 | Malik et al. | 719/330 |
| 2009/0006614 | A1 | 1/2009 | Le et al. | |
| 2009/0063619 | A1* | 3/2009 | Chijiiwa | 709/203 |
| 2009/0150905 | A1* | 6/2009 | Lin et al. | 719/313 |
| 2009/0171790 | A1 | 7/2009 | Nagarajayya | 705/14 |
| 2009/0171922 | A1* | 7/2009 | Adderly et al. | 707/4 |
| 2009/0183227 | A1* | 7/2009 | Isaacs et al. | 726/1 |
| 2009/0199210 | A1* | 8/2009 | Smith, Jr. | 719/315 |
| 2009/0228440 | A1* | 9/2009 | Leff et al. | 707/3 |
| 2009/0228490 | A1* | 9/2009 | Faenger | 707/10 |
| 2009/0240698 | A1* | 9/2009 | Shukla et al. | 707/10 |
| 2009/0259551 | A1* | 10/2009 | Chenard et al. | 705/14.55 |
| 2009/0271690 | A1* | 10/2009 | Iglesias | 715/200 |
| 2009/0307300 | A1* | 12/2009 | Guedalia et al. | 709/202 |
| 2010/0049720 | A1* | 2/2010 | Sharp et al. | 707/10 |
| 2010/0057937 | A1 | 3/2010 | Macken | |
| 2010/0094993 | A1* | 4/2010 | Rogers et al. | 709/224 |
| 2010/0131869 | A1* | 5/2010 | Adachi et al. | 715/760 |
| 2010/0313078 | A1* | 12/2010 | Burckart et al. | 714/48 |
| 2011/0039621 | A1 | 2/2011 | Steene et al. | |
| 2011/0082911 | A1 | 4/2011 | Agnoni et al. | |

OTHER PUBLICATIONS

Macken, Final Office Action; mailed Apr. 7, 2010; U.S. Appl. No. 12/201,330.

"Corba Basics", http://www.omg.org/gettingstarted/corbafaq.htm; copyright 1997-2010 *Object Management Group, Inc.*; 4 pages.

Red Hat, Non-Final Office Action mailed Sep. 7, 2010 for U.S. Appl. No. 12/201,330, 16 pages.

USPTO, Office Action for U.S. Appl. No. 12/201,306, mailed Aug. 13, 2012.

USPTO, Office Action for U.S. Appl. No. 12/201,330, mailed Jan. 25, 2011.

USPTO, Notice of Allowance for U.S. Appl. No. 12/201,330, mailed Oct. 30, 2013.

\* cited by examiner

FACILITATING CLIENT SERVER INTERACTION

CROSS-REFERENCE TO RELATED APPLICATIONS

Cross-reference is made to a co-pending patent application by Luke Macken and Toshio Kuratomi for "Method and System for Facilitating Client Server Interaction" filed on the same date as the present application and commonly owned. The cross-referenced application is incorporated herein by reference.

TECHNICAL FIELD

Embodiments of the present invention relate to a method and system for facilitating client server communication. Specifically, the embodiments of the present invention relate to a method and system for enabling client applications to obtain data from web applications in a convenient format other than a standard web page format.

BACKGROUND

Web applications offer a diversity of funcationality and data that is accessible through a standard web browser. The functionality and data are accessible through making hyper-text transfer protocol (HTTP) requests to the web applications or associated web servers. The web applications process these requests and return data in the form of hyper-text markup language (HTML) and extensible hyper-text markup language (XHTML) documents.

A programmer of a client application that does not want to merely display the returned data as a web browser would, has few desirable options to obtain the data in usable format. The programmer must code the client application to make queries specific to a particular web application. The programmer must also code the client application to parse the returned data to obtain the desired data and then reformat the data into a data structure that the client application can utilize. This coding can be time consuming and is not easily reusable as extensive additional coding has to be done to interact with each web application.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and system for facilitating communication between a client and a server. The apparatus includes a base client module and a server module. The base client module receives a request for data from a client application on a client computer. The base client module then calls a method of the server module corresponding to the request. The server module determines the type of the request being received as a request for non-web page format data. The server module interacts with the logic of the web application to obtain the requested data and sends it back to the base client in a format handled by the base client. The base client may then reformat the data to a client application requested format before passing the data to the client application. This method and system allows a client application programmer to obtain easily usable data from a web application by using the base client. The web application programmer supports this system in the form of the server module by exposing the functionality of the web application for non-web page based requests. The server module functionality may be integrated with the web application to achieve this goal. The web application programmer can also provide a sub-class of the base client that provides additional or improved functionality between the web application and the base client.

Figure 1:
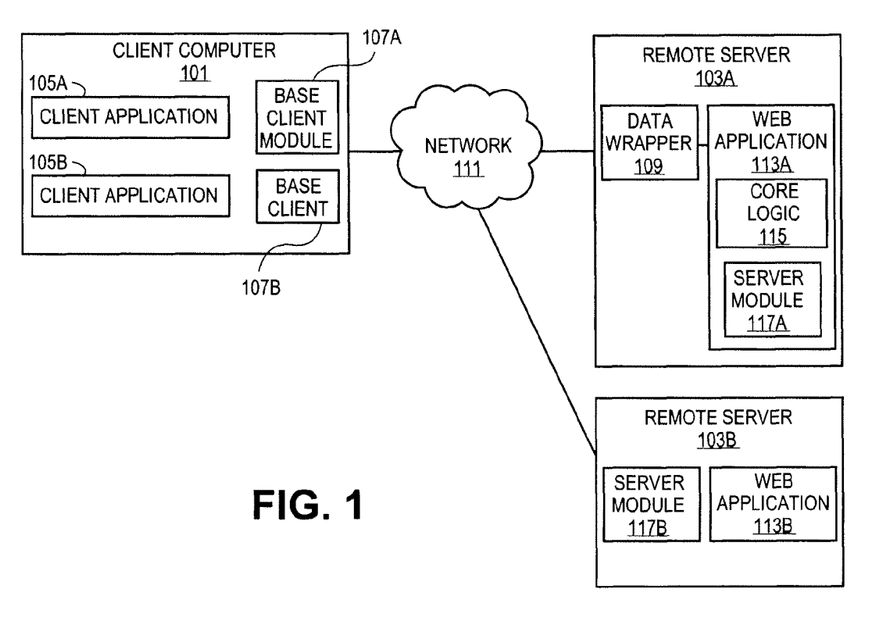
FIG. 1 is a diagram of one embodiment of a system for facilitating client server communication.

FIG. 1 is a diagram of one embodiment of a system for facilitating client server communication. The system includes a set of client computers 101 that communicate over a network 111 with a set of remote servers 113A,B. A 'set,' as used herein, refers to any whole number of items, including one item. The client computer system 101 can be any type of computing device including a desktop computer, laptop computer, handheld computer, console device, wireless device, or similar computing device. The servers 103A,B can be any type of computing device capable of executing a web application. The servers 103A,B can be desktop computers, laptop computers, dedicated servers, mainframes, console devices, wireless devices or similar computing devices. The network 111 can be any type of network including a local area network (LAN), a wide area network (WAN), such as the Internet, or any other type of network. The network 111 can be provided over any type or combination of mediums including a wired, optical, wireless or similar network architectures.

A client computer 101 includes a set of client applications 105A,B and a set of base clients 107A,B. A client application 105A,B can be any type of application including a business application, scientific application, game application or other type of application. The client application 105A,B utilizes a data set that is provided by a web application 113A,B. The client application 105A,B obtains the data set from the web application 113A,B by initiating a base client module 107A,B and calling the methods, procedures or similar functions of the base client module 107A,B.

The base client modules 107A,B are programs that facilitates communication between the client applications 105A,B and the web applications 113A,B by providing a client side mechanism for obtaining data from the web applications 113A,B in a format that is easier to utilize than the standard web page format provided by the web application (i.e., hyper-text markup language (HTML) or extensible hyper-text markup language (XHTML) formats). Further, the client programmer or web application programmer can modify the base client, for example by sub-classing a general base client class, to further process or format the data received from the web application to put it in a condition that is easy for the client application to utilize. This also simplifies the programming of the client application as it can utilize the data modeling and structures that are most efficient for its core functional purposes. Each client application 105A,B can instantiate a separate instance of a base client 107A,B. In addition, each thread or similar unit of execution for a client application 105A,B may initiate a separate base client 107A,B.

In one embodiment, each base client 107A,B is tied to a specific web application 113A,B. The base client 107A,B is provided with the uniform resource locator (URL) that identifies the associated web application 113A,B. The base client 107A,B may also be provided with a username and password for the web application 113A,B to enable authentication of a session between the respective base client 105A,B and web application 113A,B. The base client 107A,B can also authenticate with the web application 113A,B through a session identifier or similar method. In one example embodiment, the session identifier is a pseudo unique hash that identifies a user or person for a given period of time. The session identifier can be exchanged between the base client 107A,B and the web application 113A,B via a cookie or similar mechanism. Authentication can take place at the message level, such as with username/password authentication, which can be done for example through secure socket layer (SSL)/transport layer security (TLS). Authentication can also take place at other levels such as SSL client-side certificate authentication, which occurs during the connection handshake using SSL certificates. Authentication could be handled by core logic 115, server modules 117A,B or a specialized set of authentication modules. An authentication module would verify the identity of requestors before the request reaches the server modules 117A,B or core logic 115.

The remote servers 103A,B can provide any number of web applications 113A,B. The web applications 113A,B can include core logic 115 and a server module 117A or similar components. The remote servers 103A,B may also provide a separate data wrapper 109 or server module 117B. A remote server 103A,B can include any number of data wrapper 109, web applications 113,A,B and server modules 117A,B.

The web application 113A,B can provide any type of functionality or service. The core logic 115 is a component that carries out the primary functions of the web application 113A,B. The functions may include any type of calculation, database retrieval or similar function. In one embodiment, the functions operate on local data structures and databases. In another embodiment, the functions operate on remote data structures or databases or interfaces with other remote resources. Functions can include creation, deletion, editing and viewing of data from local and remote data structures and databases. Local and remote databases that can be resources manged by the functions include MySQL, SQLite, PostgreSQL and similar database systems.

The server modules 117A,B services all requests from browsers, client applications, base clients 107A,B and similar programs. In one embodiment, the server module 117A exposes the functionality of the core logic 115 to these programs. For example, base clients 107A,B can seek to create, delete, edit and view data from a database. The core logic 115 fetches the data from the database, while the server modules 117A,B and or data wrapper 109 convert the database objects into a format to be transported to the requesting client 105A,B or base client 107A,B. In another embodiment, the server module 117B interacts with the exposed functionality of the core logic of the web application. The server modules 117A,B offer methods, procedures or similar program hooks that are called by or service the requests of the browsers, base clients 107A,B or similar client applications. In one embodiment, a web application 113A,B can configure the types of requests it will service. The web application 113A,B can limit the access to a resource to browsers, base clients 107A,B or similar client applications. The web application 113A,B could also limit access to the resource to specific browsers, base clients 107A,B or similar client applications.

The server modules 117A,B determine the type of request and obtain the requisite information from the core logic 115. The type or data structure that is returned by the server modules 117A,B is dependent on the format requested by the browser, base client module 107A,B or client application. In some scenarios, the server module 117A works in conjunction with a data wrapper 119 program to provide the data in the requisite format or type. The data wrapper 119 either converts the data that is provided by or intercepted from the server module 117A into the requisite format or type before returning it to the base client 107A,B.

In another embodiment, the server module 117B is a separate application that operates as an intermediary between the base client 107A,B and the web application 113B. The server module 117B receives requests from a base client 107A,B. In some embodiments, the server module 117B handles other types of requests including web browser requests with the same exposed functionality. In other embodiments, the web application 117B handles the web browser requests and the server module 117B handles the base client requests.

In one example implementation, the web applications 113A,B are Fedora Services by Red Hat, Inc. The Fedora Services can be implemented as part of the Fedora Services Framework. Specific Fedora Services can be implemented using TurboGears by Kevin Dangoor or similar web application framework. The web applications 113A,B as well as the base client 107A,B and client applications 105A,B can be implemented using any software development environment, language, or platform.

Figure 2:
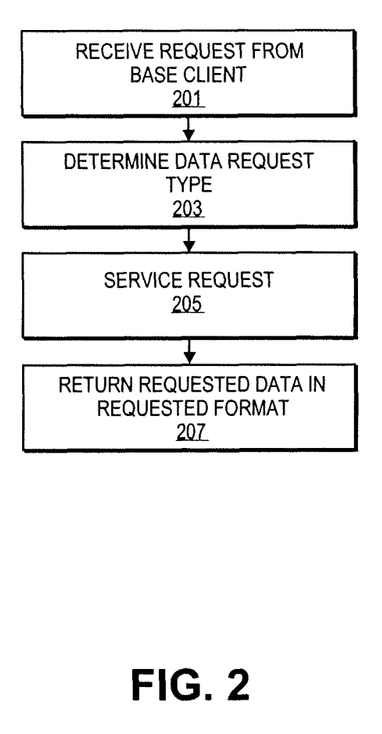
FIG. 2 is a flowchart of one embodiment of a process for handling a request from a base client.

FIG. 2 is a flowchart of one embodiment of a process for handling a request from a base client. The processing of the request from the base client is initiated in response to receiving the request (block 201). The request can be received using any protocol or by invoking any type of procedure, method or other function of the server module. In one embodiment of the process, the server module is an integrated aspect of the web application and represents the exposure of the functionality of the web application to the base client. The server module can service requests from other sources including browsers and directly from client applications.

In one embodiment, the request includes authentication data from the base client. The authentication data can also be provided as a separate request that precedes or follows the data request from the base client. The authentication data can include a username, password or similar information. This data can be used to authenticate the base client for access to the requested data and to establish a session with that base client. If the base client is approved for access then a response acknowledging the data request or similar response establishing the session can be sent to verify that the base client has been authenticated.

The server module analyzes the request to determine the source of the request or the requested format for the response data (block 203). As used herein, 'format' may refer to any combination of data structures, data types (e.g., such as types defined by software languages), protocols or method, procedure or function types or similar aspects of data syntax and semantics. In one embodiment, the request includes identifying information or explicit format request indicators or information within the request. In another embodiment, the server module analyzes the format of the request, source identification information, parameters of the request or similar information to determine the format for the response data.

The server module then calls the core logic of the web application to obtain the requisite data to service the request (block 205). The core logic can provide the data in any form to the server module. The server module may request the data in the required format or receive the data in a different or raw form that is then placed into the requisite format. The properly formatted data is then returned to the requesting base client (block 207). Any protocol method of transmission can be used to return the requested data to the base client. The server module and/or the web application can track session data for each connected base client to ensure that the requested data is returned to the appropriate base client.

In some embodiments, an assisting program referred to as a data wrapper may work in conjunction with the service module to place the data in the requisite form. The data wrapper program may be called or similarly interact with the service module to effect the reformatting or similar processing of the data to place it in the requisite format.

If the core logic is unable to fulfill the request a error occurs. The error can take the form of an exception or similar type of error. The server module handles the error and inserts an error indicator into a response for the base client. The error indicator can provide the base client with information about the type of error that occurred. The base client can then convert it to a format of error that is understood by the client application or can similarly handle the error.

Figure 3:
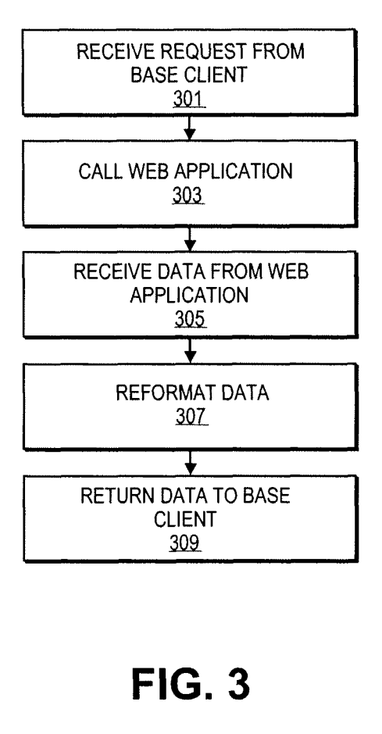
FIG. 3 is a flowchart of another embodiment of a process for handling a request from a base client.

FIG. 3 is a flowchart of another embodiment of a process for handling a request from a base client. In this embodiment, the service module is a discrete module separate from the web application. The service module acts as an intermediary between the base client and the web application. This embodiment may be used to avoid having to directly modify the web application. The process is initiated in response to receiving a request from the base client (block 301). The request from the base client can be received using any protocol, method, procedure or function call of the server module. The request can be a persistent or non-persistent request. A persistent request remains open through out the duration of multiple individual data requests. Use of persistent requests allows a base client to initiate one request with a server that can be utilized through out the lifetime of the client program to make any number of data requests without having to initiate a new request. The user of non-persistent requests minimizes the tracking of open requests and are handled individually.

In one embodiment, the request includes authentication data from the base client. The authentication data can also be provided as a separate request that precedes or follows the data request from the base client. The authentication data can include a username, password or similar information. This data can be used to authenticate the base client for access to the requested data and to establish a session with that base client. If the base client is approved for access then a response acknowledging the data request or similar response establishing the session can be sent to verify that the base client has been authenticated.

In response to the request, the server module makes a call to web application to obtain the requisite data (block 303). The server module may need to identify the web application functionality or aspect of the core logic to be used to obtain the requested data. The appropriate function, procedure or method of the web application is determined by analysis of the request from the base client or the correspondence between the received request and a function of the web application can be programmed into the server module.

The server module then receives the data from the web application (block 305). This data can be in any format including HTML or XHTML format that is standard for most web applications. The server module then reformats the data to a format acceptable to the base client module (block 307). Any type of processing, analysis and modification can be made to the data from the web application to generate the data in the appropriate format for the base client. In one embodiment, the data is formatted into a Javascript Object Notation (JSON) format.

The properly formatted data is then returned to the base client (block 309). Any protocol or method of transmission can be utilized to return the data to the base client. The server module may maintain session data with each connected base client to ensure that requested data is returned to the appropriate base client. The base client can then make any necessary further modifications for the client application that ultimately utilizes the data. Responses can be streaming or non-streaming responses. If persistent requests are utilized, then the base client can open a single connection. Instead of frequently polling the server for new data, the client receives response data asynchronously as it is sent by the server. Non-streaming responses are made to specific requests and require a new request to obtain a new response.

If the core logic is unable to fulfill the request a error occurs. The error can take the form of an exception or similar type of error. The server module handles the error and inserts an error indicator into a response for the base client. The error indicator can provide the base client with information about the type of error that occurred. The base client can then convert it to a format of error that is understood by the client application or can similarly handle the error.

Figure 4:
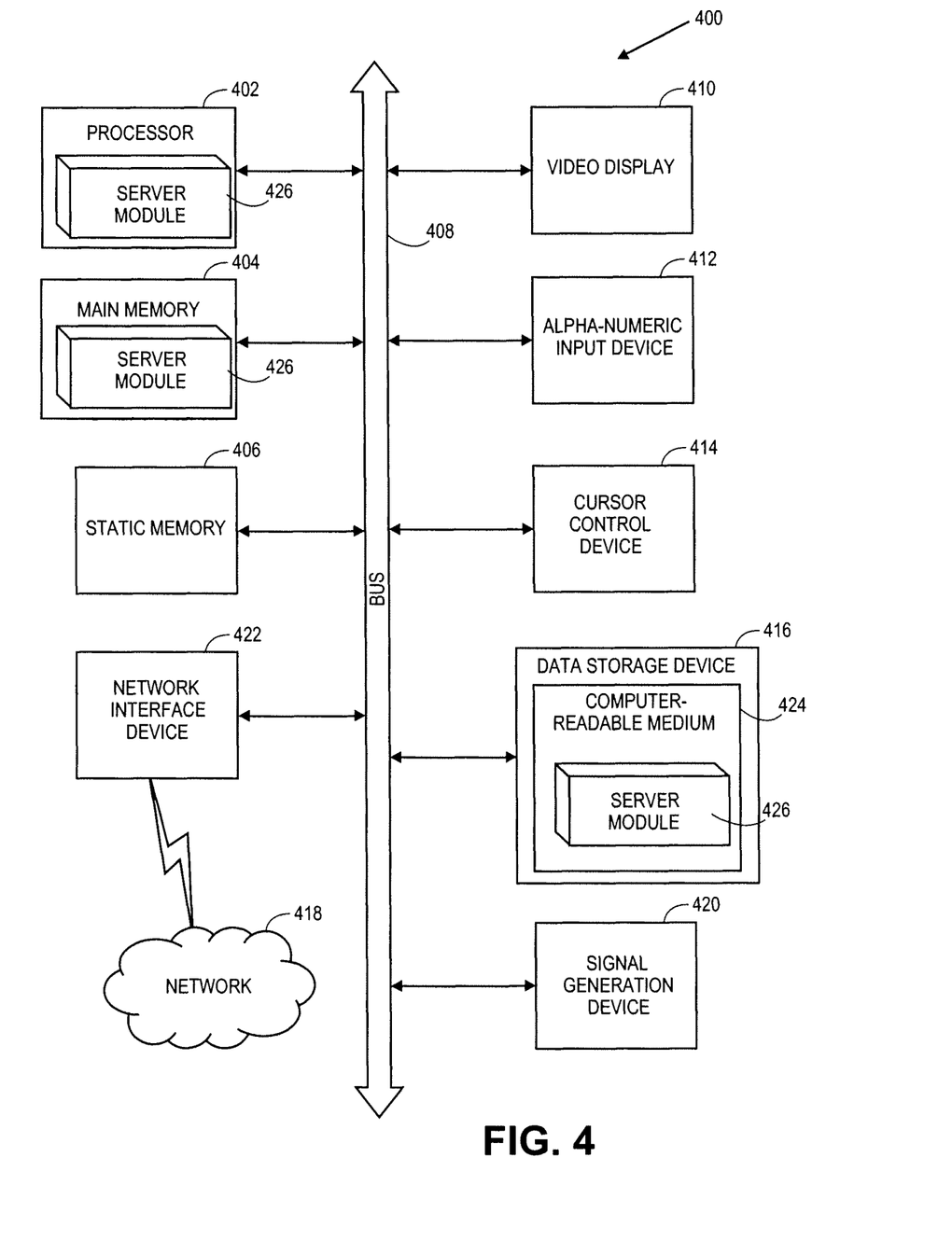
FIG. 4 is a diagram of one embodiment of a computer system for providing the server module.

FIG. 4 is a diagram of one embodiment of a computer system for providing the server module. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer executing the base client module and the server computer executing the server module) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable medium), which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the server module 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the server module 426) embodying any one or more of the methodologies or functions described herein. The server module 426 may also reside, completely or at least partially, within the main memory 404 and/or within the processing device 402 during execution thereof by the computer system 400, the main memory 404 and the processing device 402 also constituting machine-readable storage media. The server module 426 may further be transmitted or received over a network 418 via the network interface device 422.

The machine-readable storage medium 424 may also be used to store the server module 426 persistently. While the machine-readable storage medium 424 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "computing," "generating," "determining," "selecting," "displaying," "receiving," "assigning," "requesting," "running," "executing," "checking," "initiating," "returning," "retrieving," "outputting," "performing," "sending," "obtaining," "converting," "inserting," "forwarding," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for installing live operating systems to removable storage devices has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method comprising:
receiving a request from a remote base client module at a client computer system for data provided by a web application;
establishing, by a server module executable by a processor device, a persistent session with the remote base client module in response to receiving the request;
analyzing the request to determine a requested format of the data for the request, wherein the requested format is different than an initial format in which the web application provides the data, and wherein the server module and the web application reside on one or more server computer systems that are separate from the client computer system;

analyzing the request to determine at least one of a function, procedure or method of the web application to service the request;

calling the at least one of the function, procedure or method of the web application;

obtaining the data for the request from the web application in response to calling the function, procedure or method of the web application, wherein the data is obtained from the web application across multiple first responses;

converting the first responses from the initial format to multiple corresponding second responses in the requested format; and sending the second responses to the remote base client module through the persistent session, wherein the persistent session remains open while the second responses are sent to the remote base client module.

2. The computer-implemented method of claim 1, wherein the request is a call to a server module method.

3. The computer-implemented method of claim 1, further comprising: inserting an error indicator in the second responses.

4. The computer-implemented method of claim 1, wherein the requested format is JavaScript Object Notation and the initial format is hyper-text markup language (HTML) or extensible hyper-text markup language (XHTML).

5. The computer-implemented method of claim 1, further comprising:

receiving authentication data from the remote base client module; and authenticating the authentication data, wherein establishing the persistent session is further in response to successfully authenticating the authentication data.

6. The computer-implemented method of claim 5, further comprising: sending an authentication response to the remote base client module.

7. The computer-implemented method of claim 1, wherein the server module is separate from the web application.

8. A non-transitory computer readable storage medium, having instructions stored therein, which when executed, cause a processor device to perform operations comprising:

receiving a request from a remote base client module at a client computer system for data provided by a web application;

establishing, by a server module executable by the processor device, a persistent session with the remote base client module in response to receiving the request;

analyzing the request to determine a requested format of the data for the request, wherein the requested format is different than an initial format in which the web application provides the data, and wherein the server module and the web application reside on one or more server computer systems that are separate from the client computer system;

analyzing the request to determine at least one of a function, procedure or method of the web application to service the request;

calling the at least one of the function, procedure or method of the web application;

obtaining the data for the request from the web application in response to calling the function, procedure or method of the web application, wherein the data is obtained from the web application across multiple first responses;

converting the first responses from the initial format to multiple corresponding second responses in the requested format; and sending the second responses to the remote base client module through the persistent session, wherein the persistent session remains open while the second responses are sent to the remote base client module.

9. The non-transitory computer readable storage medium of claim 8, wherein the request is a call to a server module method.

10. The non-transitory computer readable storage medium of claim 8, wherein the operations further comprise: inserting an error indicator in the second responses.

11. The non-transitory computer readable storage medium of claim 8, wherein the requested format is JavaScript Object Notation and the initial format is hyper-text markup language (HTML) or extensible hyper-text markup language (XHTML).

12. The non-transitory computer readable storage medium of claim 8, wherein the operations further comprise:

receiving authentication data from the remote base client module; and authenticating the authentication data, wherein establishing the persistent session is further in response to successfully authenticating the authentication data.

13. The non-transitory computer readable storage medium of claim 12, wherein the operations further comprise: sending an authentication response to the remote base client module.

14. The non-transitory computer readable storage medium of claim 8, wherein the server module is separate from the web application.

15. A system comprising:

a system memory to store a server module; and a processor device operatively coupled to the system memory to execute the server module to:

receive a request from a remote base client module at a client computer system for data provided by a web application, establish a persistent session with the remote base client module in response to receipt of the request;

analyze the request to determine a requested format of the data for the request, wherein the requested format is different than an initial format in which the web application provides the data, and wherein the server module and the web application reside on one or more server computer systems that are separate from the client computer system, analyze the request to determine at least one of a function, procedure or method of the web application to service the request, call the at least one of the function, procedure or method of the web application, obtain the data for the request from the web application in response to calling the function, procedure or method of the web application, wherein the data is obtained from the web application across multiple first responses, convert the first responses from the initial format to multiple corresponding second responses in the requested format, and send the second responses to the remote base client module through the persistent session, wherein the persistent session remains open while the second responses are sent to the remote base client module.

16. The system of claim 15, further comprising: a data wrapper module to receive response data that the server module is unable to convert to the requested format, the data wrapper module to convert the response data to the requested format.

17. The system of claim 16, wherein the server module is a component of the web application that is separate from request servicing logic.

18. The system of claim 15, wherein the request is a call to a server module method.

19. The system of claim 15, wherein the requested format is JavaScript Object Notation and the initial format is hyper-text markup language (HTML) or extensible hyper-text markup language (XHTML).

20. The system of claim 15, wherein the server module is further to:
- receive authentication data from the remote base client module; and
- authenticate the authentication data, wherein the server module establishes the persistent session further in response to successful authentication of the authentication data.

21. The system of claim 15, wherein the server module is separate from the web application.

* * * * *